(12) United States Patent
Matsumoto et al.

(10) Patent No.: US 8,754,165 B2
(45) Date of Patent: Jun. 17, 2014

(54) HEAT-CONDUCTIVE SILICONE GREASE COMPOSITION

(75) Inventors: Nobuaki Matsumoto, Annaka (JP); Ikuo Sakurai, Annaka (JP); Kunihiro Yamada, Annaka (JP); Masaya Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 119 days.

(21) Appl. No.: 13/084,641

(22) Filed: Apr. 12, 2011

(65) Prior Publication Data

US 2011/0248211 A1  Oct. 13, 2011

(30) Foreign Application Priority Data

Apr. 13, 2010 (JP) .................. 2010-091900

(51) Int. Cl.
C08K 3/22 (2006.01)
C08K 3/08 (2006.01)

(52) U.S. Cl.
USPC ........... 524/588; 524/268; 524/428; 524/432; 524/437; 524/439; 524/441; 524/443

(58) Field of Classification Search
USPC ......... 524/268, 428, 432, 437, 439, 433, 441, 524/588
See application file for complete search history.

(56) References Cited

U.S. PATENT DOCUMENTS

| 6,380,301 B1 * | 4/2002 | Enami et al. ............ 524/588 |
| 6,649,258 B2 | 11/2003 | Yamada et al. |
| 6,818,600 B2 | 11/2004 | Yamada et al. |
| 7,622,539 B2 | 11/2009 | Fukui et al. |
| 2004/0242762 A1 | 12/2004 | Horikoshi et al. |
| 2006/0257672 A1 | 11/2006 | Horikoshi et al. |

FOREIGN PATENT DOCUMENTS

| CN | 100374490 C | 3/2008 |
| DE | 10 2004 025 867 A1 | 1/2005 |
| EP | 1 352 947 A1 | 10/2003 |
| EP | 1 254 924 B1 | 6/2004 |
| JP | 61-157569 A | 7/1986 |
| JP | 4-13767 A | 1/1992 |
| JP | 8-208993 A | 8/1996 |
| JP | 2002-327116 A | 11/2002 |
| JP | 2003-301189 A | 10/2003 |
| JP | 2004-352947 A | 12/2004 |
| JP | 2006-169411 A | 6/2006 |

OTHER PUBLICATIONS

Extended European Search Report for European Application No. 11161042.4 mailed Aug. 5, 2011.

* cited by examiner

Primary Examiner — Margaret Moore
(74) Attorney, Agent, or Firm — Birch, Stewart, Kolasch & Birch, LLP

(57) ABSTRACT

A heat-conductive silicone grease composition is provided comprising (A) a trialkoxysilyl-endcapped organopolysiloxane having a viscosity of 0.1-1,000 Pa·s at 25° C., (B) a specific organopolysiloxane, (C) a heat-conductive filler, and (D) a condensation catalyst. The composition is amenable to coat at the initial, thereafter increases its viscosity with moisture at room temperature rather than curing so that it remains flexible, easy to re-work, and anti-sagging, eliminates a need for cold storage and for hot application, avoids any undesired viscosity buildup, is easy to manufacture, and has good heat transfer.

10 Claims, No Drawings

HEAT-CONDUCTIVE SILICONE GREASE COMPOSITION

CROSS-REFERENCE TO RELATED APPLICATION

This non-provisional application claims priority under 35 U.S.C. §119(a) on Patent Application No. 2010-091900 filed in Japan on Apr. 13, 2010, the entire contents of which are hereby incorporated by reference.

TECHNICAL FIELD

This invention relates to a heat-conductive silicone grease composition which is readily dispensable due to a low initial viscosity and increases its viscosity with moisture at room temperature to become a silicone grease having heat-dissipating and anti-sagging properties.

BACKGROUND ART

To take an approach to the low-carbon society, an increasing need for careful management of energy exists in the electric/electronic, transportation and other fields. This requires more precise control of a system which is, in turn, equipped with more than ever electronic components. In fact, the automotive field, for example, has the trend that the proportion of hybrid vehicles, plug-in hybrid vehicles, and electric vehicles replacing gasoline vehicles is increasing in the market. These hybrid and electric vehicles must be loaded with motors, inverters, batteries, and other electronic components which are unnecessary for gasoline vehicles. Since these electronic components generate heat during operation, efficient heat dissipation is essential to insure normal operation of the components. Accordingly, the heat-dissipating materials become of greater importance.

More than ever electronic components must be mounted within a limited space, indicating that electronic Components are kept under widely varying conditions including temperature, mount angle, etc. Under the circumstances, heat-generating electronic components and heatsinks are not always held horizontal and accordingly, a heat-conductive material connecting them is often mounted at a certain angle. In such a service environment, a heat-conductive silicone adhesive material, heat-conductive potting material, or RTV heat-conductive silicone rubber composition is used in order to prevent the heat-conductive material from sagging and falling out of the space between the heat-generating component and the heatsink, as disclosed in JP-A H08-208993, JP-A S61-157569, and JP-A 2004-352947. However, all these heat-conductive materials form a complete bond to members and undesirably lack re-workability. Since the heat-conductive material becomes very hard after bonding, it cannot withstand repeated stresses induced by thermal strain and separates apart from the heat-generating component to allow for the entry of air, leading to a ramp of thermal resistance.

The above problem can be solved by a one package addition cure heat-conductive silicone composition as disclosed in JP-A 2002-327116. This composition remains re-workable and anti-sagging even after heat curing, and the cured composition is soft enough to play the role of a stress relief agent. Nevertheless, this heat-conductive material suffers from several problems. For example, it must be stored in a refrigerator or freezer and thawed prior to use. In applying the heat-conductive material, it must be heated and cooled. Then the manufacturing system must be equipped with a heating/cooling oven. The heating and cooling steps take a long time, leading to a reduction of manufacturing efficiency. From the standpoint of energy efficiency, these steps are inefficient because not only the heat-conductive material, but also an overall component must be heated. Additionally, there is a potential risk that if any cure inhibitor is present on the coating surface, the heat-conductive material remains undercured even when heated.

To obviate the cumbersome handling of heat-conductive material including refrigeration/thaw management for storage and heating/cooling steps for application, JP-A 2003-301189 proposes a one package addition cure heat-conductive silicone composition which has been heat crosslinked during preparation. This heat-conductive material has overcome the above-discussed problems, but the tradeoff is that it has too high a viscosity to coat. There are problems that heavy loading of filler is difficult due to the high viscosity of the base polymer and the manufacture process involving crosslinking reaction takes a long time.

It would be of significance to have a heat-conductive silicone grease composition which is amenable to coat at the initial, thereafter increases its viscosity at room temperature rather than curing at room temperature so that it remains flexible, easy to re-work and anti-sagging, does not need refrigeration or freezing for storage, does not need heating upon application, avoids any undesired viscosity buildup, is easy to manufacture, allows for heavy loading of filler, and offers high heat transfer.

CITATION LIST
Patent Document 1: JP-A H08-208993
Patent Document 2: JP-A S61-157569
Patent Document 3: JP-A 2004-352947 (US 2004242762, DE 102004025867, CN 100374490)
Patent Document 4: JP-A 2002-327116 (EP 1254924 B1, U.S. Pat. No. 6,649,258)
Patent Document 5: JP-A 2003-301189 (EP 1352947 A1, U.S. Pat. No. 6,818,600)

SUMMARY OF INVENTION

An object of the invention is to provide a heat-conductive silicone grease composition which is amenable to coat at the initial, thereafter increases its viscosity with moisture at room temperature rather than curing at room temperature so that it remains flexible, anti-sagging, and easy to re-work, eliminates a need for refrigeration or freezing during storage and for heating upon application, avoids any undesired viscosity buildup, is easy to manufacture, and allows for heavy loading of filler.

The inventors have found that a heat-conductive silicone grease composition comprising (A) a trialkoxysilyl-end-capped organopolysiloxane having a viscosity of 0.1 to 1,000 Pa·s at 25° C., (B) an organopolysiloxane having the general formula (1) shown below, (C) a heat-conductive filler having a heat conductivity of at least 10 W/m° C., and (D) a condensation catalyst as essential components is amenable to coat at the initial, thereafter increases its viscosity with moisture at room temperature rather than curing at room temperature so that it remains flexible, easy to re-work, and anti-sagging, eliminates a need for refrigeration or freezing during storage and for heating upon application, avoids any undesired viscosity buildup, is easy to manufacture, allows for heavy loading, and has good heat transfer.

The invention provides a heat-conductive silicone grease composition that will increase its viscosity with moisture at room temperature, comprising (A) 1 to 40 parts by weight of an organopolysiloxane capped with trialkoxysilyl at both ends and having a viscosity of 0.1 to 1,000 Pa·s at 25° C., (B) 60 to 99 parts by weight of having the general formula (1):

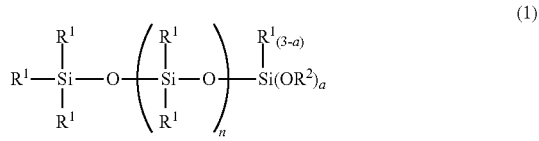

wherein $R^1$ is each independently a substituted or unsubstituted monovalent hydrocarbon radical, $R^2$ is each independently an alkyl, alkoxyalkyl, alkenyl or acyl radical, n is an integer of 5 to 100, and a is an integer of 1 to 3, the sum of components (A) and (B) being 100 parts by weight, (C) 100 to 2,000 parts by weight of a heat-conductive filler having a heat conductivity of at least 10 W/m° C., and (D) 0.1 to 20 parts by weight of a condensation catalyst.

In a preferred embodiment, the composition may further comprising, relative to 100 parts by weight of components (A) and (B) combined, (E) 0.1 to 20 parts by weight of an organosilane having the general formula (2):

wherein $R^3$ is each independently an unsubstituted $C_6$-$C_{20}$ alkyl radical, $R^4$ is each independently a substituted or unsubstituted, $C_1$-$C_{20}$ monovalent hydrocarbon radical, $R^5$ is each independently a $C_1$-$C_6$ alkyl radical, b is an integer of 1 to 3, c is an integer of 0 to 2, and b+c is 1 to 3, or a partial hydrolytic condensate thereof, and/or (F) 0.1 to 900 parts by weight of an organopolysiloxane of the average compositional formula (3):

wherein $R^6$ is each independently a substituted or unsubstituted, $C_1$-$C_{18}$ monovalent hydrocarbon radical, and d is a positive number of 1.8 to 2.2, and having a viscosity of 0.05 to 1,000 Pa·s at 25° C.

ADVANTAGEOUS EFFECTS OF INVENTION

The heat-conductive silicone grease composition is amenable to coat at the initial, thereafter increases its viscosity with moisture at room temperature rather than curing at room temperature so that it remains flexible, anti-sagging, and easy to re-work. Also the composition eliminates a need for refrigeration or freezing during storage and for heating upon application, avoids any undesired viscosity buildup, is easy to manufacture, and allows for heavy loading.

DESCRIPTION OF EMBODIMENTS

As used herein, the notation (Cn-Cm) means a radical containing from n to m carbon atoms per radical.

Briefly stated, the heat-conductive silicone grease composition that will increase its viscosity with moisture at room temperature comprises (A) a trialkoxysilyl-endcapped organopolysiloxane having a viscosity of 0.1 to 1,000 Pa·s at 25° C., (B) an organopolysiloxane having the general formula (1), (C) a heat-conductive filler having a heat conductivity of at least 10 W/m° C., and (D) a condensation catalyst as essential components. These components are described in detail.

Component (A) which is a base polymer of the composition is an organopolysiloxane capped with trialkoxysilyl at both ends. The trialkoxysilyl radicals at both ends of the molecular chain include those wherein each alkoxy moiety is of 1 to 6 carbon atoms, more preferably 1 to 4 carbon atoms, such as trimethoxysilyl and triethoxysilyl.

The structure of the organopolysiloxane other than the terminal structure is not particularly limited. It may be any conventional linear organopolysiloxane which cures into an elastomer. Substituent radicals bonded to silicon atoms other than the terminal silicon include $C_1$-$C_8$ monovalent hydrocarbon radicals, for example, alkyl radicals such as methyl, ethyl, propyl, butyl, pentyl and hexyl, cycloalkyl radicals such as cyclohexyl, alkenyl radicals such as vinyl and allyl, and aryl radicals such as phenyl and tolyl, and halogenated forms of the foregoing monovalent hydrocarbon radicals in which some or all hydrogen atoms are substituted by halogen atoms (e.g., chloro, fluoro or bromo), such as chloromethyl and trifluoromethyl.

The organopolysiloxane as component (A) should have a viscosity at 25° C. of 0.1 to 1,000 Pa·s, preferably 0.2 to 500 Pa·s, and more preferably 0.3 to 100 Pa·s. An organopolysiloxane with a viscosity of less than 0.1 Pa·s cures rather than increasing its viscosity. An organopolysiloxane having a viscosity in excess of 1,000 Pa·s provides the silicone grease composition with too high a viscosity to coat. It is noted that throughout the disclosure the viscosity is measured by a rotational viscometer.

Preferably component (A) is an organopolysiloxane having the following formula (4).

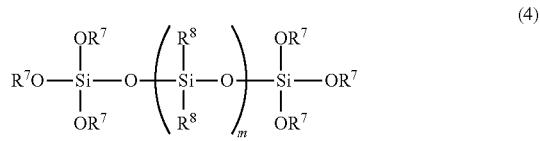

Herein $R^7$ is each independently a $C_1$-$C_4$ alkyl radical, such as methyl, ethyl, propyl or butyl, with methyl and ethyl being preferred. $R^8$ is each independently a substituted or unsubstituted, $C_1$-$C_8$ monovalent hydrocarbon radical, examples of which include alkyl radicals such as methyl, ethyl, propyl, butyl, pentyl, hexyl, and heptyl, aryl radicals such as phenyl and tolyl, and halogenated forms of the foregoing monovalent hydrocarbon radicals in which some or all hydrogen atoms are substituted by halogen atoms (e.g., chloro, fluoro or bromo), such as chloromethyl, 3-chloropropyl, and trifluoromethyl. Inter alia, methyl and ethyl are preferred. The subscript m is such a number that the organopolysiloxane of formula (4) may have a viscosity of 0.1 to 1,000 Pa·s at 25° C.

Component (A) is used in an amount of 1 to 40 parts by weight, preferably 5 to 30 parts by weight, provided that components (A) and (B) total to 100 parts by weight. A composition containing less than 1 part by weight of component (A) does not increase its viscosity whereas a composition containing more than 40 parts by weight of component (A) cures rather than viscosity buildup.

Component (B) is an organopolysiloxane having the general formula (1):

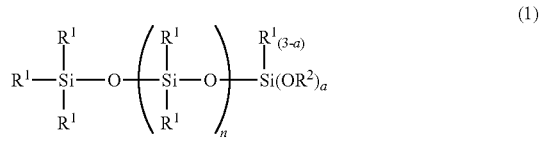

wherein R¹ is each independently a substituted or unsubstituted monovalent hydrocarbon radical, R² is each independently an alkyl, alkoxyalkyl, alkenyl or acyl radical, n is an integer of 5 to 100, and a is an integer of 1 to 3. This organopolysiloxane should preferably have a viscosity of 0.005 to 100 Pa·s at 25° C.

Component (B) serves as a crosslinker. It also plays the role of rendering the silicone grease composition flowable and easy to handle even when the composition is so heavily loaded with the heat-conductive filler (C) that the composition may become highly heat conductive.

In formula (1), R¹ is each independently a substituted or unsubstituted monovalent hydrocarbon radical, preferably of 1 to 10 carbon atoms, more preferably 1 to 6 carbon atoms, and even more preferably 1 to 3 carbon atoms. Examples include straight, branched and cyclic alkyl, alkenyl, aryl, aralkyl and halogenated alkyl radicals. Suitable straight alkyl radicals include methyl, ethyl, propyl, hexyl and octyl. Suitable branched alkyl radicals include isopropyl, isobutyl, tert-butyl and 2-ethylhexyl. Suitable cyclic alkyl radicals include cyclopentyl and cyclohexyl. Suitable alkenyl radicals include vinyl and allyl. Suitable aryl radicals include phenyl and tolyl. Suitable aralkyl radicals include 2-phenylethyl and 2-methyl-2-phenylethyl. Suitable haloalkyl radicals include 3,3,3-trifluoropropyl, 2-(nonafluorobutyl)ethyl, and 2-(heptadecafluorooctyl)ethyl. Preferably R¹ is methyl, phenyl or vinyl.

R² is each independently an alkyl, alkoxyalkyl, alkenyl or acyl radical. Suitable alkyl radicals include straight, branched and cyclic alkyl radicals as exemplified above for R¹. Suitable alkoxyalkyl radicals include methoxyethyl and methoxypropyl. Suitable alkenyl radicals include vinyl and allyl. Suitable acyl radicals include acetyl and octanoyl. Preferably R² is alkyl, and more preferably methyl or ethyl.

The subscript n is an integer of 5 to 100, preferably 10 to 50, and a is an integer of 1 to 3, preferably equal to 3.

The organopolysiloxane as component (B) should preferably have a viscosity at 25° C. of 0.005 to 100 Pa·s, more preferably 0.005 to 50 Pa·s. If the organopolysiloxane has a viscosity of less than 0.005 Pa·s, the resulting silicone grease composition is susceptible to oil bleeding and sagging. If this viscosity is in excess of 100 Pa·s, the resulting silicone grease composition becomes less flowable and ineffective in coating operation.

Illustrative non-limiting examples of the organopolysiloxane as component (B) are given below where Me stands for methyl.

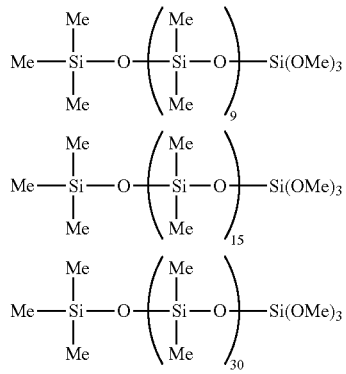

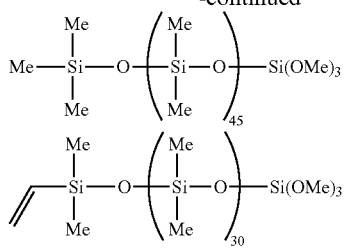

Component (B) is used in an amount of 60 to 99 parts by weight, preferably 70 to 99 parts by weight, provided that the sum of components (A) and (B) is 100 parts by weight. A composition containing less than 60 parts by weight of component (B) becomes hard rather than flexible after viscosity buildup whereas a composition containing more than 99 part by weight of component (B) does not increase its viscosity.

Component (C) is a heat conductive filler having a thermal conductivity of at least 10 W/m° C. If a filler with a thermal conductivity of less than 10 W/m° C. is used, the silicone grease composition also has a lower than desired thermal conductivity. Examples of the heat conductive filler include aluminum, copper, silver, nickel, gold, alumina, zinc oxide, magnesium oxide, aluminum nitride, boron nitride, silicon nitride, diamond, and carbon, all in powder form. Any desired filler can be used as long as it has a thermal conductivity of at least 10 W/m° C. A powder of one type or a mixture of two or more types may be used.

The heat conductive filler is typically particulate and may be of any desired shape including irregular and spherical shapes. Preferably the heat conductive filler has an average particle size in the range of 0.1 to 200 μm, more preferably 0.1 to 100 μm. With an average particle size of less than 0.1 μm, the composition may lose grease nature and become less spreadable. If the average particle size is more than 200 μm, the grease composition may lose uniformity. As used herein, the "average particle size" is a weight average value or median diameter on particle size measurement by the laser light diffraction method or the like.

Component (C) is loaded in an amount of 100 to 2,000 parts by weight, preferably 500 to 1,500 parts by weight, relative to 100 parts by weight of components (A) and (B) combined. Less than 100 parts by weight of component (C) fails to provide the desired heat conductivity whereas composition with more than 2,000 parts by weight of component (C) loses grease nature and becomes less spreadable.

Since the heat-conductive silicone grease composition increases its viscosity through condensation, a catalyst is used therein as component (D). Suitable catalysts include alkyltin esters such as dibutyltin diacetate, dibutyltin dilaurate and dibutyltin dioctoate; titanic acid esters such as tetraisopropoxytitanium, tetra-n-butoxytitanium, tetrakis(2-ethylhexoxy)titanium, dipropoxybis(acetylacetonato)titanium, and titanium isopropoxyoctylene glycol; titanium chelates such as diisopropoxybis(ethyl acetoacetate)titanium, diisopropoxybis(methyl acetoacetate) titanium, diisopropoxybis(acetylacetonate)titanium, dibutoxybis(ethyl acetoacetonate) titanium, and dimethoxybis(ethyl acetoacetonate)titanium; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl-substituted alkoxysilanes such as 3-aminopropyltriethoxysilane and N-β-(aminoethyl)-γ-aminopropyltrimethoxysilane; amine compounds and salts thereof such as hexylamine and dodecylamine phosphate; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; and guanidyl-containing silanes or siloxanes such as tetramethylguanidyl propyltrimethoxysilane, tetramethylguanidyl propylmethyldimethoxysilane, and tetramethylguanidyl propyltris(trimethylsiloxy)silane. These catalysts may be used alone or in admixture of two or more. Of these, the titanium chelates are preferred.

Component (D) is used in an amount of 0.1 to 20 parts by weight, preferably 5 to 15 parts by weight, relative to 100 parts by weight of components (A) and (B) combined. Outside the range, less amounts of component (D) lead to a loss of storage stability and a short shelf life whereas an excess of component (D) is uneconomical.

To the silicone grease composition, (E) an organosilane having the general formula (2):

wherein $R^3$ is each independently an unsubstituted $C_6$-$C_{20}$ alkyl radical, $R^4$ is each independently a substituted or unsubstituted, $C_1$-$C_{20}$ monovalent hydrocarbon radical, $R^5$ is each independently a $C_1$-$C_6$ alkyl radical, b is an integer of 1 to 3, c is an integer of 0 to 2, and b+c is 1 to 3 or a partial hydrolytic condensate thereof may be compounded, if desired, for further reducing the viscosity of the composition.

In formula (2), $R^3$ is an unsubstituted $C_6$-$C_{20}$ alkyl radical, for example, hexyl, octyl, decyl, dodecyl, tetradecyl, hexadecyl, and octadecyl. Of these, $C_6$-$C_{14}$ alkyl radicals are preferred.

$R^4$ is a substituted or unsubstituted, $C_1$-$C_{20}$ monovalent hydrocarbon radical, examples of which include alkyl radicals such as methyl, ethyl and propyl, cycloalkyl radicals such as cyclopentyl and cyclohexyl, alkenyl radicals such as vinyl and allyl, aryl radicals such as phenyl and tolyl, aralkyl radicals such as 2-phenylethyl and 2-methyl-2-phenylethyl, and halogenated forms of the foregoing monovalent hydrocarbon radicals in which some or all hydrogen atoms are substituted by halogen atoms (e.g., chloro, fluoro or bromo), such as 3,3,3-trifluoropropyl, 2-(perfluorobutyl)ethyl, 2-(perfluorooctyl)ethyl and p-chlorophenyl. Inter alia, methyl is preferred.

$R^5$ is a $C_1$-$C_6$ alkyl radical, such as methyl, ethyl, propyl, butyl, pentyl or hexyl. Inter alia, methyl and ethyl are preferred. The subscript b is an integer of 1 to 3, c is an integer of 0 to 2, and b+c is 1, 2 or 3, preferably equal to 1.

The organosilane or partial hydrolytic condensate thereof as component (E) is used in an amount of 0.1 to 20 parts by weight, preferably 1 to 10 parts by weight, relative to 100 parts by weight of components (A) and (B) combined. With less than 0.1 part by weight of component (E), the water resistance of the heat-conductive filler or the viscosity reducing effect may be poor. More than 20 parts by weight of component (E) may achieve no further effect and be uneconomical.

To the silicone grease composition, (F) an organopolysiloxane of the average compositional formula (3):

wherein $R^6$ is each independently a substituted or unsubstituted, $C_1$-$C_{18}$ monovalent hydrocarbon radical, and d is a positive number of 1.8 to 2.2, and having a viscosity of 0.05 to 1,000 Pa·s at 25° C. may be compounded, if desired, for adjusting the initial viscosity of the composition.

In formula (3), $R^6$ is a substituted or unsubstituted, $C_1$-$C_{18}$ monovalent hydrocarbon radical, examples of which include alkyl radicals such as methyl, ethyl, propyl, pentyl, hexyl, heptyl, octyl, nonyl, decyl, dodecyl, tetradecyl, hexadecyl and octadecyl, cycloalkyl radicals such as cyclopentyl and cyclohexyl, alkenyl radicals such as vinyl and allyl, aryl radicals such as phenyl and tolyl, aralkyl radicals such as 2-phenylethyl and 2-methyl-2-phenylethyl, and halogenated forms of the foregoing monovalent hydrocarbon radicals in which some or all hydrogen atoms are substituted by halogen atoms (e.g., chloro, fluoro or bromo), such as 3,3,3-trifluoropropyl, 2-(perfluorobutyl)ethyl, 2-(perfluorooctyl)ethyl and p-chlorophenyl. Inter alia, methyl, phenyl and $C_6$-$C_{14}$ alkyl radicals are preferred.

The subscript d is a positive number of 1.8 to 2.2, preferably 1.9 to 2.2, when considered from the standpoint of the desired viscosity of the silicone grease composition.

The organopolysiloxane as component (F) should preferably have a viscosity at 25° C. of 0.05 to 1,000 Pa·s, more preferably 0.5 to 100 Pa·s. If the organopolysiloxane has a viscosity of less than 0.05 Pa·s, the resulting silicone grease composition may be susceptible to oil bleeding. If this viscosity is in excess of 1,000 Pa·s, the resulting silicone grease composition may become ineffective in coating operation.

Illustrative non-limiting examples of the organopolysiloxane as component (F) are given below wherein Me stands for methyl.

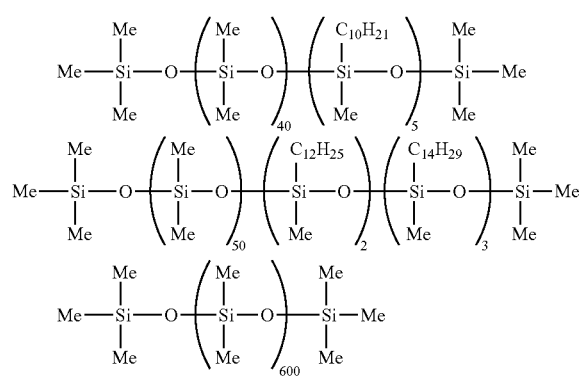

The organopolysilane as component (F) is used in an amount of 0.1 to 900 parts by weight, preferably 1 to 300 parts by weight, relative to 100 parts by weight of components (A) and (B) combined. If the amount of component (F) is more than 900 parts by weight, the resulting silicone grease composition may not readily increase its viscosity with moisture at room temperature.

The silicone grease composition of the invention is prepared by mixing the essential and optional components on any well-known means until uniform. The composition thus obtained should preferably have a viscosity at 25° C. of 5 to 350 Pa·s, more preferably 10 to 300 Pa·s, and even more preferably 50 to 250 Pa·s.

Also preferably the silicone grease composition has a heat conductivity of at least 0.5 W/m° C. as measured by the hot disk method using a thermal conductivity analyzer TPA-501 (Kyoto Electronics Mfg. Co., Ltd.).

The heat-conductive silicone grease composition is distinguished from ordinary silicone rubber compositions in that it increases its viscosity without curing. As long as moisture is available, the composition increases its viscosity even at room temperature, eliminating a step of heating. The composition may be stored without a need for refrigeration or freezing.

The heat-conductive silicone grease composition increases its viscosity under ambient conditions, for example, at a temperature of 23±2° C. and a relative humidity (RH) of 50±5% for 7 days.

When the heat-conductive silicone grease composition increases its viscosity, the ultimate viscosity preferably corresponds to a hardness of 1 to 100 units, more preferably 10 to 80 units, and even more preferably 15 to 60 units, as measured by an Asker hardness tester for ultra-soft material CS-R2 (Kobunshi Keiki Co., Ltd.).

The heat-conductive silicone grease composition has many advantages since it merely increases its viscosity without curing as mentioned above. On use as heat-dissipating grease, it is readily dispensable due to a low initial viscosity. Since the composition increases its viscosity with moisture at room temperature, it is unlikely to sag and remains re-workable. Therefore, the composition is useful in a wide variety of heat-dissipating applications such as electric/electronic and transportation fields where it is desired to minimize the installation investment and manufacture expense.

EXAMPLE

Examples of the invention are given below by way of illustration and not by way of limitation. In Examples, Me stands for methyl.

The following components were prepared.
Component A
A-1: dimethylpolysiloxane capped with trimethoxysilyl at both ends and having a viscosity of 1 Pa·s at 25° C.
A-2: dimethylpolysiloxane capped with trimethoxysilyl at both ends and having a viscosity of 20 Pa·s at 25° C.
A-3 (comparison): dimethylpolysiloxane capped with trimethoxysilyl at both ends and having a viscosity of 0.08 Pa·s at 25° C.
A-4 (comparison): dimethylpolysiloxane capped with trimethoxysilyl at both ends and having a viscosity of 1,100 Pa·s at 25° C.
Component B
B-1: organopolysiloxane of the following formula.

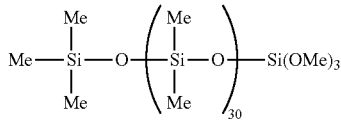

B-2: organopolysiloxane of the following formula.

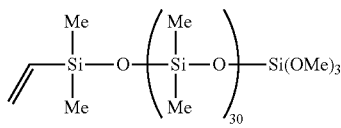

Component C
Powders C-1 to C-3 were prepared by milling the following powders (1), (2) and (3) in a mixing ratio shown in Table 1 for 15 minutes on a 5-L gate mixer (5-L Planetary Mixer by Inoue Mfg. Co., Ltd.).
(1) aluminum powder with average particle size 4.9 μm (236 W/m° C.)
(2) aluminum powder with average particle size 15.0 (236 W/m° C.)
(3) zinc oxide powder with average particle size 1.0 μm (54 W/m° C.)

TABLE 1

| Component C | 4.9 μm aluminum powder, g | 15.0 μm aluminum powder, g | 1.0 μm zinc oxide powder, g |
|---|---|---|---|
| C-1 | 2,000 | 0 | 500 |
| C-2 | 0 | 2,000 | 500 |
| C-3 | 0 | 0 | 500 |

Component D
D-1: diisopropoxybis(ethyl acetoacetate) titanium
Component E
E-1: organosilane of $C_{10}H_{21}Si(OCH_3)_3$
Component F
F-1: organopolysiloxane of the following formula having a viscosity of 5 Pa·s at 25° C.

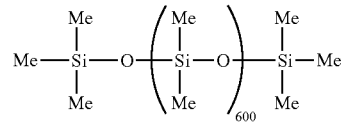

Examples 1 to 6 and Comparative Examples 1 to 6

Compositions of Examples and Comparative Examples were prepared by mixing components (A) to (F) in the amounts shown in Tables 2 and 3. Specifically, a 5-L gate mixer (5-L Planetary Mixer by Inoue Mfg. Co., Ltd.) was charged with the predetermined amounts of components (A), (B) and (C), and optionally component (F), followed by agitation at 150° C. for 3 hours while deaerating. The mixture was then cooled to room temperature, to which component (D) and optionally component (E) were added. The mixture was agitated at room temperature until uniform while deaerating. The resulting grease composition was measured for viscosity, heat conductivity, and hardness by the test methods shown below. The results are also shown in Tables 2 and 3.
Viscosity
The initial viscosity of a grease composition was measured at 25° C. by a spiral viscometer PC-1T (Malcom Co., Ltd.).
Heat Conductivity
A grease composition was sandwiched between a pair of aluminum disks having a diameter of 2.5 mm and a thickness of 1.0 mm to form a test piece. The thickness of the test piece was measured by a micrometer (Mitsutoyo Co., Ltd.). The thickness of the grease composition was computed by subtracting the thickness of two aluminum plates from the overall thickness. In this way, several test pieces having grease layers with different thickness were prepared. The thermal resistance ($mm^2$-K/W) of the grease composition was measured at 25° C. using the test piece and a thermal resistance analyzer based on the laser flash method (xenon flash lamp analyzer LFA447 NanoFlash® by Netzsch GmbH). For each grease composition, the thermal resistance values of grease are plotted as a function of thickness to draw a straight line, and a heat conductivity was computed from the reciprocal of a gradient of that line.

Hardness

A grease composition of 3 mm thick was held at 23±2° C. and RH 50±5% for 7 days, after which it was measured for hardness by an Asker hardness tester for ultra-soft material CS-R2 (Kobunshi Keiki Co., Ltd.). Notably the cured compositions of Comparative Examples were measured for hardness by a Durometer Type A hardness tester for hard material.

TABLE 2

| Formulation | | Example | | | | | |
|---|---|---|---|---|---|---|---|
| (pbw) | | 1 | 2 | 3 | 4 | 5 | 6 |
| Component A | A-1 | 10 | 10 | 0 | 10 | 30 | 30 |
| | A-2 | 0 | 0 | 10 | 0 | 0 | 0 |
| | A-3 | 0 | 0 | 0 | 0 | 0 | 0 |
| | A-4 | 0 | 0 | 0 | 0 | 0 | 0 |
| Component B | B-1 | 90 | 0 | 90 | 90 | 70 | 70 |
| | B-2 | 0 | 90 | 0 | 0 | 0 | 0 |
| Component C | C-1 | 0 | 0 | 0 | 1,000 | 0 | 0 |
| | C-2 | 1,100 | 1,100 | 1,100 | 0 | 0 | 0 |
| | C-3 | 0 | 0 | 0 | 0 | 400 | 450 |
| Component D | D-1 | 8 | 8 | 8 | 8 | 7 | 7 |
| Component E | E-1 | 2 | 2 | 2 | 2 | 0 | 3 |
| Component F | F-1 | 0 | 0 | 0 | 0 | 0 | 100 |
| Test results | | | | | | | |
| Initial viscosity (Pa·s) | | 65 | 70 | 150 | 100 | 60 | 250 |
| Heat conductivity (W/m·°C.) | | 4.7 | 4.6 | 4.7 | 3.5 | 1.1 | 1.2 |
| Hardness after viscosity buildup (Asker CS-R2) | | 20 | 22 | 30 | 18 | 45 | 50 |

TABLE 3

| Formulation | | Comparative Example | | | | | |
|---|---|---|---|---|---|---|---|
| (pbw) | | 1 | 2 | 3 | 4 | 5 | 6 |
| Component A | A-1 | 90 | 0 | 0 | 10 | 10 | 0.1 |
| | A-2 | 0 | 0 | 0 | 0 | 0 | 0 |
| | A-3 | 0 | 10 | 0 | 0 | 0 | 0 |
| | A-4 | 0 | 0 | 10 | 0 | 0 | 0 |
| Component B | B-1 | 10 | 90 | 90 | 90 | 90 | 99.9 |
| | B-2 | 0 | 0 | 0 | 0 | 0 | 0 |
| Component C | C-1 | 0 | 0 | 0 | 2,200 | 90 | 0 |
| | C-2 | 1,100 | 1,100 | 1,100 | 0 | 0 | 1,100 |
| | C-3 | 0 | 0 | 0 | 0 | 0 | 0 |
| Component D | D-1 | 1 | 8 | 8 | 8 | 8 | 8 |
| Component E | E-1 | 0 | 2 | 2 | 2 | 0 | 2 |
| Component F | F-1 | 0 | 0 | 0 | 0 | 0 | 1,000 |
| Test results | | | | | | | |
| Initial viscosity (Pa·s) | | 350 | 40 | not greasy | not greasy | 10 | 100 |
| Heat conductivity (W/m·°C.) | | 4.9 | 4.7 | unmeasurable | unmeasurable | 0.4 | 1.3 |
| Hardness after curing (Durometer Type A) | | 90 | 100 | unmeasurable | unmeasurable | unmeasurable | no viscosity buildup |

Japanese Patent Application No. 2010-091900 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat-conductive silicone grease composition that will increase its viscosity with moisture at room temperature, comprising (A) 1 to 40 parts by weight of an organopolysiloxane capped with trialkoxysilyl at both ends and having a viscosity of 0.1 to 1,000 Pa·s at 25° C., (B) 60 to 99 parts by weight of an organopolysiloxane having the general formula (1):

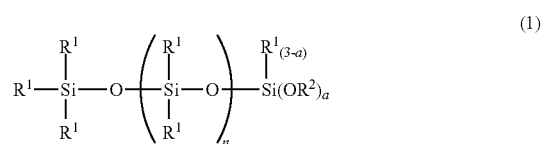

(1)

wherein $R^1$ is each independently a substituted or unsubstituted monovalent hydrocarbon radical, $R^2$ is each independently an alkyl, alkoxyalkyl, alkenyl or acyl radical, n is an integer of 5 to 100, and a is an integer of 1 to 3, the sum of components (A) and (B) being 100 parts by weight, (C) 100 to 2,000 parts by weight of a heat-conductive filler having a heat conductivity of at least 10 W/m·°C., and (D) 0.1 to 20 parts by weight of a condensation catalyst, wherein the viscosity of said composition as prepared is 50 to 250 Pa·s at 25° C. and wherein when said heat-conductive silicone grease composition increases its viscosity at a temperature of 23±2° C. and a relative humidity (RH) of 50±5% for 7 days, the viscosity corresponds to a hardness of 15 to 60 units as measured by an Asker hardness tester.

2. The composition of claim 1, further comprising (E) 0.1 to 20 parts by weight relative to 100 parts by weight of components (A) and (B) combined of an organosilane having the general formula (2):

(2)

wherein $R^3$ is each independently an unsubstituted $C_6$-$C_{20}$ alkyl radical, $R^4$ is each independently a substituted or unsubstituted, $C_1$-$C_{20}$ monovalent hydrocarbon radical, $R^5$ is each independently a $C_1$-$C_6$ alkyl radical, b is an integer of 1 to 3, c is an integer of 0 to 2, and b+c is 1 to 3, or a partial hydrolytic condensate thereof.

3. The composition of claim 1, further comprising
(F) 0.1 to 900 parts by weight relative to 100 parts by weight of components (A) and (B) combined of an organopolysiloxane having the average compositional formula (3):

wherein $R^6$ is each independently a substituted or unsubstituted, $C_1$-$C_{18}$ monovalent hydrocarbon radical, and d is a positive number of 1.8 to 2.2, said organopolysiloxane having a viscosity of 0.05 to 1,000 Pa·s at 25° C.

4. The heat-conductive silicone grease composition of claim 1, wherein component (A) is an organopolysiloxane having the following formula (4):

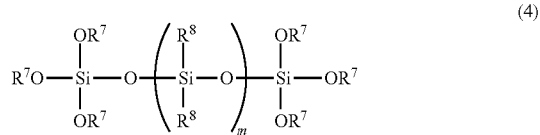

wherein $R^7$ is each independently a $C_1$-$C_4$ alkyl radical, $R^8$ is each independently a substituted or unsubstituted, $C_1$-$C_8$ monovalent hydrocarbon radical, and the subscript m is such a number that the organopolysiloxane of formula (4) is have a viscosity of 0.1 to 1,000 Pa·s at 25° C.

5. The heat-conductive silicone grease composition of claim 1, wherein, in component (B), $R^1$ is methyl, phenyl, or vinyl, $R^2$ is methyl or ethyl, n is 10 to 50, a is 3, and component (B) has a viscosity of 0.005 to 100 Pa·s at 25° C.

6. The heat-conductive silicone grease composition of claim 1, wherein component (C) is a powder selected from the group consisting of aluminum powder, copper powder, silver powder, nickel powder, gold powder, alumina powder, zinc oxide powder, magnesium oxide powder, aluminum nitride powder, boron nitride powder, silicon nitride powder, diamond powder, carbon powder, and mixtures thereof.

7. The heat-conductive silicone grease composition of claim 1, wherein component (D) is a member selected from the group consisting of alkyltin esters, titanic acid esters, titanium chelates, organometallic compounds, aminoalkyl-substituted alkoxysilanes, amine compounds and salts thereof, quaternary ammonium salts, alkali metal salts of lower fatty acids, dialkylhydroxylamines, guanidyl-containing silanes, guanidyl-containing siloxanes, and mixtures thereof.

8. The heat-conductive silicone grease composition of claim 2, wherein $R^3$ is a $C_6$-$C_{14}$ alkyl radical, $R^4$ is methyl, and b+c is 1.

9. The heat-conductive silicone grease composition of claim 3, wherein $R^6$ is methyl, phenyl, or a $C_6$-$C_{14}$ alkyl radical and d is 1.9 to 2.2.

10. The heat-conductive silicone grease composition of claim 1, wherein:
component (A) is a dimethylpolysiloxane capped with trimethoxysilyl at both ends, having a viscosity of 1 to 200 Pa·s at 25° C.;
component (B) is a compound of formula (1)

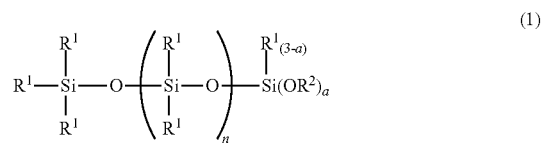

wherein the left-most R' moiety is methyl or vinyl and all of the remaining $R^1$ moieties are methyl, the $R^2$ moieties are methyl, the subscript a is 3, and the subscript n is 30;
component (C) is aluminum powder or zinc oxide powder with an average particle size of 1 μm to 15.0 μm; and
component (D) is diisopropoxybis(ethyl acetoacetate)titanium, said heat-conductive silicone grease composition further comprising
as a component (E), $C_{10}H_{21}Si(OCH_3)_3$; and
as a component (F), a compound of the formula

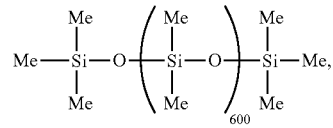

having a viscosity of 5 Pa·s at 25° C.

* * * * *